United States Patent
Sun

(10) Patent No.: US 6,826,699 B1
(45) Date of Patent: Nov. 30, 2004

(54) METHOD AND APPARATUS FOR PERFORMING AUTHENTICATION AND KEY EXCHANGE PROTOCOLS WITH MULTIPLE SINK DEVICES

(75) Inventor: Jadie Soo Sun, Belmont, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 924 days.

(21) Appl. No.: 09/692,672

(22) Filed: Oct. 19, 2000

(51) Int. Cl.[7] .............................................. G06F 11/30
(52) U.S. Cl. ....................... 713/201; 713/153; 713/160; 713/170; 713/171; 380/201; 380/229; 380/283; 705/51; 705/57; 725/80; 725/82; 725/116
(58) Field of Search ................................ 380/201, 229, 380/283; 705/51, 57; 713/153, 160, 170, 171, 201; 725/80, 82, 116

(56) References Cited

U.S. PATENT DOCUMENTS

| | | | | | |
|---|---|---|---|---|---|
| 6,038,628 | A | * | 3/2000 | Leung et al. | 710/305 |
| 6,133,938 | A | * | 10/2000 | James | 725/80 |
| 6,199,136 | B1 | * | 3/2001 | Shteyn | 710/35 |
| 6,292,892 | B1 | * | 9/2001 | Davis | 713/156 |
| 6,591,419 | B2 | * | 7/2003 | Barry et al. | 725/25 |
| 6,665,020 | B1 | * | 12/2003 | Stahl et al. | 348/552 |
| 6,684,401 | B1 | * | 1/2004 | Zou | 725/80 |
| 6,748,080 | B2 | * | 6/2004 | Russ et al. | 380/239 |

OTHER PUBLICATIONS

System @ IC News, NEC Bulletin, Issue 2, 2001, "AV Links for IEEE 1394" pp. 5–6.*

Matsushita Press Release, (Tokyo, Japan, Dec. 4, 1998), "Matsushita Develops IEEE 1394 Single Chip LSI Supporting DTCI,".*

* cited by examiner

Primary Examiner—Gregory Morse
Assistant Examiner—Paul E. Callahan
(74) Attorney, Agent, or Firm—Murabito & Hao LLP

(57) ABSTRACT

A method and system for a source device to simultaneously perform authentication and key exchange (hereinafter referred to as "AKE") protocols with multiple sink devices. In a communication network that comprises a source device and multiple sink devices in compliance with the 5C Digital Transmission Content Protection specification, the present invention discloses a method and system for using a multiple client state machine comprising a multiple client state machine table to allow the source device to track at which stage each sink device is undergoing within a 5C DTCP AKE protocol. Specifically, an embodiment allows the source device to receive an audio/video control command or response associated with the 5C DTCP AKE protocol from a particular sink device, access the table to determine at which stage that sink is undergoing within the 5C DTCP AKE protocol, and process the AV/C command or response depending on that stage. Further, by virtue of the state table, an embodiment allows the source device to simultaneously conduct multiple 5C DTCP AKE protocols with multiple sink devices because the source can determine the exact stage within the protocol any sink device is undergoing to properly process an AV/C command or response from that sink device.

27 Claims, 4 Drawing Sheets

400

```
          Typedef struc multiple_state-machine
410 ⎰    }
    ⎱    DWORD guidhigh;                    415
         DWORD guidlow;
420      Int srcstage;                      416
         } MULTIPLE_STATE_MACHINE
```

METHOD AND APPARATUS FOR PERFORMING AUTHENTICATION AND KEY EXCHANGE PROTOCOLS WITH MULTIPLE SINK DEVICES

BACKGROUND OF THE INVENTION

1. Field of the Invention

The present invention relates to the field of authentication and key exchange protocols between an electronic source device and multiple electronic sink devices.

2. Related Art

The digital configuration of conventional media provides for virtually no loss associated with the transmission of digital information or data over a communication network. Digital audio and visual electronic devices receiving digital information or data from a remote location can therefore provide unprecedented performance when copying, displaying, or playing video or audio information. However, because of its digital format, audio and video information or data can be easily copied and stored in a digital device for future use without any degradation of audio or video quality. Therefore, the copy is exactly the same as the original no matter how many copies are made from the original, or how far removed from the master is the copy in a copy chain.

Since there is essentially no degradation of audio or video quality in the transmission or copying of digital information, encryption of audio and video information or data provides a means for protecting the owner's property rights. Presently, various cryptography protocols exist to combat the unauthorized copying and use of copyrighted digital content transmitted between digital electronic devices. In these protocols, two coupled devices successfully complete an authorization and key exchange protocol before sharing valuable information. Successful completion of the protocol determines that both devices are authorized to pass protected entertainment information or data between each other. Failure of one or both devices during authentication will preclude any transmission of protected digital information or data. Once both devices are authenticated, an encryption key is passed between the two devices in order to decrypt the transmission of encrypted digital information or data.

The 5C Digital Transmission Content Protection (hereinafter referred to as "5C DTCP") encryption protocol whose portions were developed by a consortium of five companies: Hitachi, Ltd.; Intel Corporation; Matsushita Electric Industrial Co., Ltd.; Sony Corporation; and Toshiba Corporation is an example. This 5C DTCP specification defines an authentication and key exchange (hereinafter referred to as "AKE") cryptography protocol for preventing audio/video entertainment content or data from unauthorized copying, intercepting, and tampering as it is transmitted across digital communication networks, such as those that utilize a high performance serial bus that conforms to the IEEE 1394 standard. Only authorized devices that conform to the specification can legitimately use and copy entertainment content transmitted from a source device and received at another approved sink device. Such authorized digital devices could be personal computers, digital televisions, digital VCRs, digital video recorders, digital set-top boxes, digital video discs, audio/video servers, and other future digital devices. Additionally, the 5C DTCP protocol is compatible with other approved copy protection systems such as the DVD Content Scrambling System.

More specifically, communication networks for the home or business may utilize a IEEE 1394 bus protocol capable of handling encryption and decryption of digital information such as that described in the 5C DTCP specification. Typically, a digital electronic device that is a source of digital content could be coupled to multiple digital electronic sink devices that are capable of receiving the digital content. The network could support parallel, series, or a combination of both configurations.

Previously, a digital electronic source device could only perform the authentication and key exchange protocol as defined in the 5C DTCP specification with one other sink device that is requesting the digital content. One disadvantage is that a second digital electronic device that is also requesting digital content from the source device would have to wait until the completion of the 5C DTCP AKE protocol with the first device before initializing is own 5C DTCP AKE sequence with the source device. Correspondingly, there was no capability to conduct multiple 5C DTCP AKE protocols between the source and multiple sink devices. Thus, a need exists to minimize the time to perform an AKE protocol.

Another problem associated with only conducting an authentication and key exchange protocol between one pair of digital electronic devices is the inability to maximize the bandwidth over the high speed bus network, such as those networks compliant with the IEEE 1394 protocol. Thus, it would be advantageous to maximize the bandwidth of a particular communication network.

SUMMARY OF THE INVENTION

Accordingly, the present invention provides a method and system for a digital electronic source device to simultaneously perform authentication and key exchange protocols with multiple sink devices through the use of a multiple client state machine table. This invention also maximizes the bandwidth of a communication network by allowing a single source device to simultaneously send multiple audio/video data packets to multiple sink devices. Further, this invention also allows a source device to recall authenticating a sink device such that the two devices would not have to perform an authentication and key exchange protocol again even if the two devices have not been on the same communication network since performing the initial authentication and key exchange protocol. The present invention provides these advantages and others not specifically mentioned above but described in the sections to follow.

Specifically, in an embodiment of the present invention, a method for a source device to perform authentication and key exchange (hereinafter referred to as "AKE") protocols with multiple sink devices is described. In a communication network that comprises a source device and multiple sink devices in compliance with the 5C Digital Transmission Content Protection (hereinafter referred to as "5C DTCP") specification, the present invention is directed to a method and system for using a multiple client state machine comprising a multiple client state table to allow the source device to track at which stage each sink device is undergoing within a 5C DTCP AKE protocol.

Specifically, embodiments of the present invention allows the source device to receive an audio/video control command or response associated with the 5C DTCP AKE protocol from a sink device, access the state machine table to determine at which stage the sink device is engaging within the 5C DTCP protocol, and process the command or response depending on the stage.

Further, by virtue of the state machine table, embodiments of the present invention allows the source device to simultaneously conduct multiple 5C DTCP AKE protocols (with multiple sink devices because the source can determine the exact stage a particular sink device is engaging to properly process an audio/video control command or response associated with a 5C DTCP AKE protocol from that sink device.

In another embodiment, by virtue of the state machine table, a digital electronic device that is a source of digital content is capable of performing step location such that the source device will terminate a 5C DTCP AKE protocol with a sink device if the source determines that an audio/video control command or response from a particular sink device does not correspond to the proper stage that sink device is engaging within the protocol.

In still another embodiment, a multiple client state machine table allows a digital electronic source device to determine whether a digital electronic sink device previously has successfully completed a 5C DTCP AKE protocol with the source device even if the two devices have not been coupled to the same communication network since performing the initial 5C DTCP AKE protocol.

DETAILED DESCRIPTION OF THE INVENTION

Figure 1:
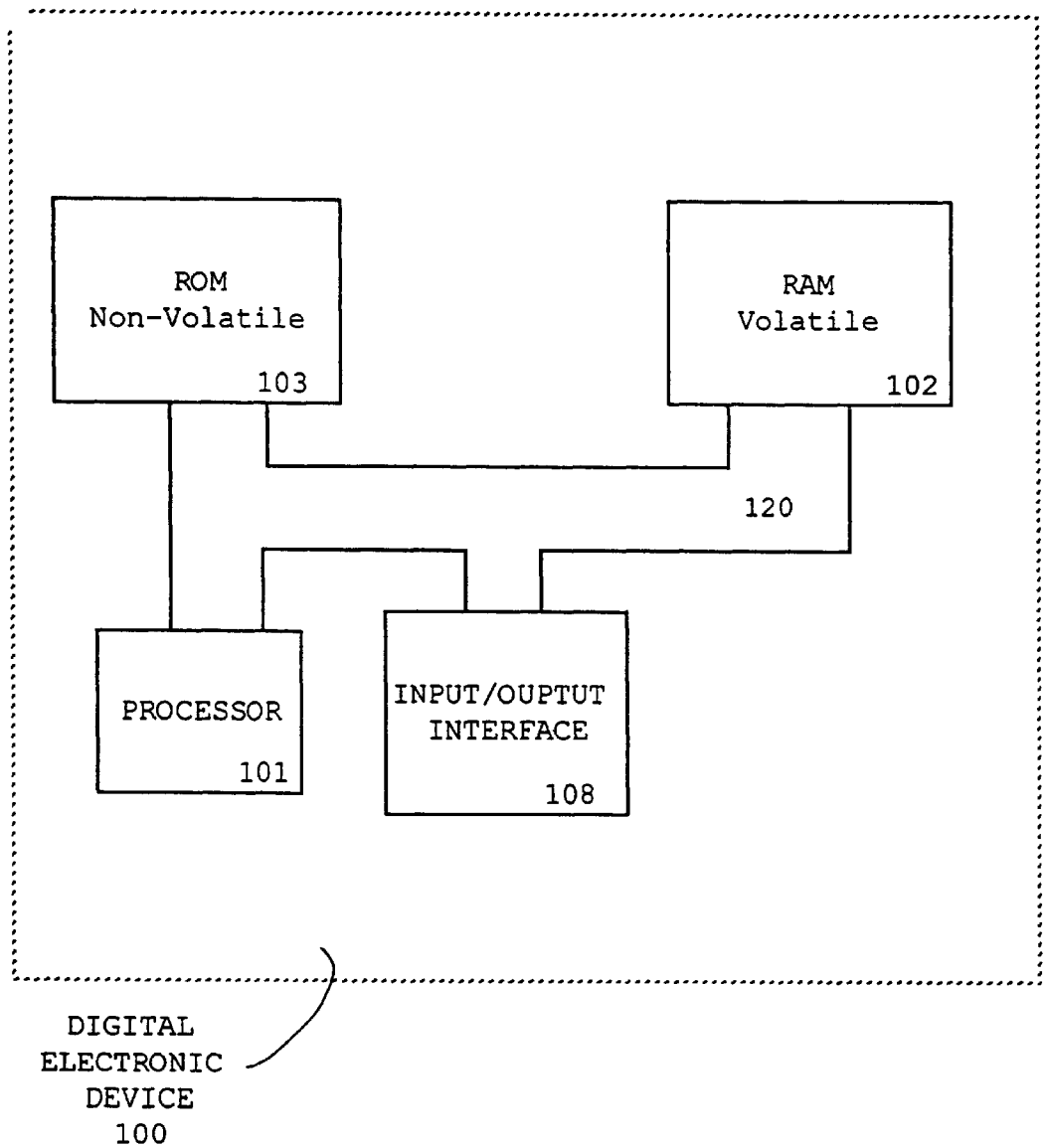
FIG. 1 is a logical block diagram of a digital electronic device in accordance with an embodiment of the present invention.

Reference will now be made in detail to the preferred embodiments of the present invention, a method and system for performing an authentication and key exchange protocol simultaneously with multiple sink devices, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "processing" or "computing" or "translating" or "calculating" or "determining" or "scrolling" or "displaying" or "recognizing" or the like, refer to the actions and processes of a computer system, or a similar electronic computing device, that manipulates and transforms data represented as physical (electronic) quantities within the computer system's registers and memories into other data similarly represented as physical quantities within the computer system's memories or registers or other such information storage, transmission, or display devices.

Referring now to FIG. 1, a block diagram of an exemplary digital electronic device 100 is shown. Device 100 can be a source device that transmits digital content or a sink device that receives digital content. For contextual purposes, the electronic device 100 can be used in a unit that is compliant with the 5C Digital Content Transmission Protection cryptography protocol system that controls a sink device's access to the transmitted media. Such a unit could be a consumer electronic device. However, the present invention is well suited to being used in systems with other types of copy protection protocol. The electronic device 100 can be part of a larger device such as a digital television (DTV), digital video cassette recorder (DVCR), digital audio receiver, digital versatile disc (DVD), digital camera, personal computer, digital set-top box, etc.

Device 100 can include any computer-controlled software application for allowing a digital electronic source device to simultaneously perform authentication and key exchange protocols with multiple digital electronic sink devices. In general, device 100 comprises an address/data bus 120 or other means for communicating information, a central processor 101 coupled with the bus 120 for processing information and instructions, a volatile memory 102 (e.g., random access memory (RAM), static RAM, dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled with the bus 120 for storing static information and instructions for the processor 101. Additionally, device 100 includes an Input/Output (I/O) interface 108 for providing a communication link between device 100 and a network environment. The I/O interface 108 allows device 100 to receive digital content from an upstream digital electronic source device or to transmit digital content to a downstream digital electronic sink device.

Bus 120 is shown as a single bus line for clarity. It is appreciated by those skilled in the art that bus 120 can include subcomponents of specific data lines and/or control lines for the communication of commands and data between appropriate devices. It is further appreciated by those skilled in the art that bus 120 can be a parallel configuration, a serial configuration, or a "FireWire" (IEEE 1394) configuration, and that bus 120 can include numerous gateways, interconnects, and translators, as appropriate for a given application.

Processor 101 can either be a dedicated controller, an existing system processor, or it can be a dedicated digital signal processing (DSP) processor. Digital electronic device 100 can also include other components (not shown) such as the following: a display device coupled to bus 120, e.g. for viewing the status of device; a user input device coupled to bus 120, e.g., for receiving user commands; additional processors, e.g., for performing dedicated functions; an optional data storage device (e.g., memory card, hard drive, optical disk, etc.) coupled with the bus 120 for storing information and instructions; etc.

Figure 2:
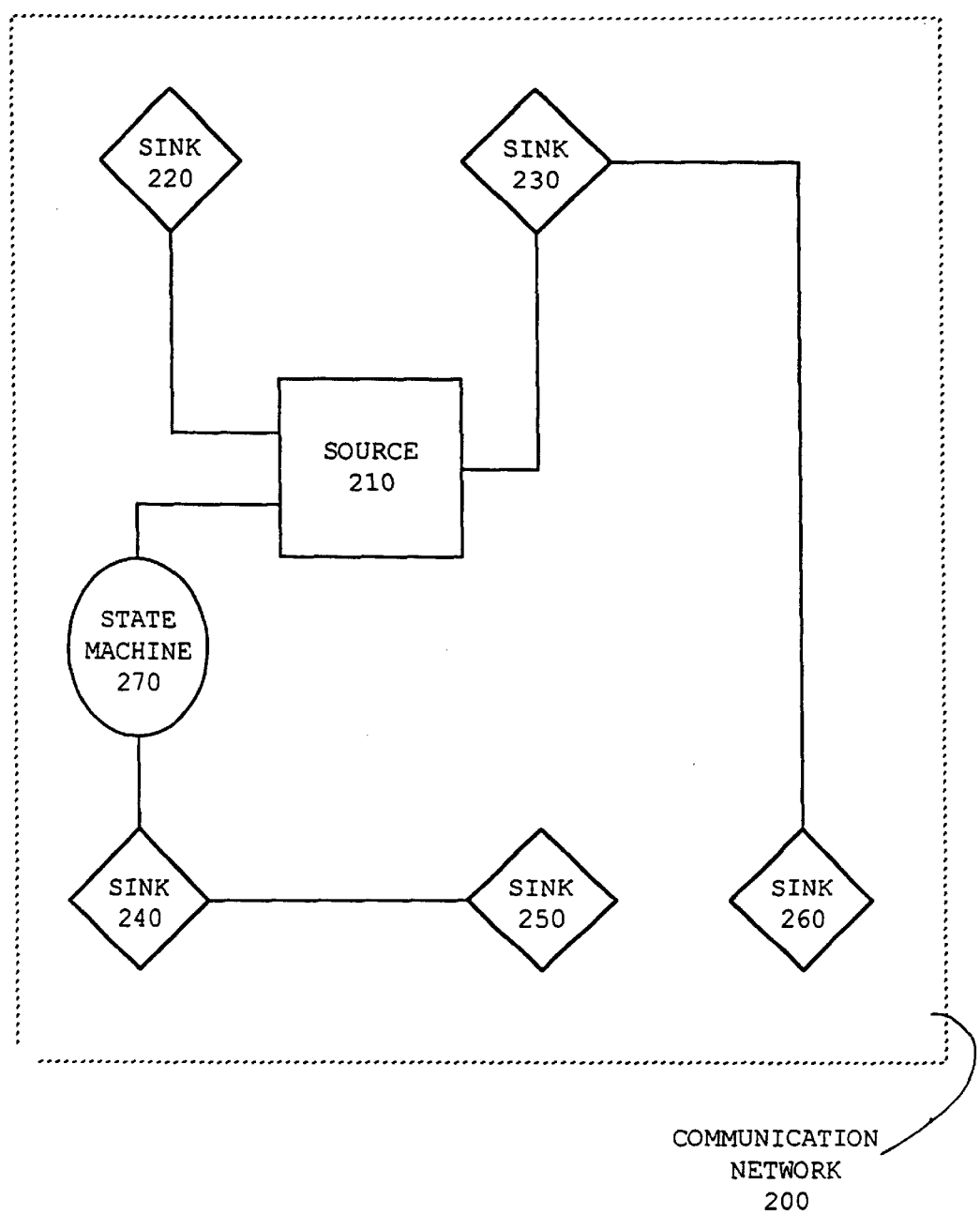
FIG. 2 illustrates a block diagram of a communications network environment that follows the IEEE 1394 bus protocol including a digital electronic source device coupled with various digital electronic sink devices in accordance with an embodiment of the present invention.
Figures 3, 4:
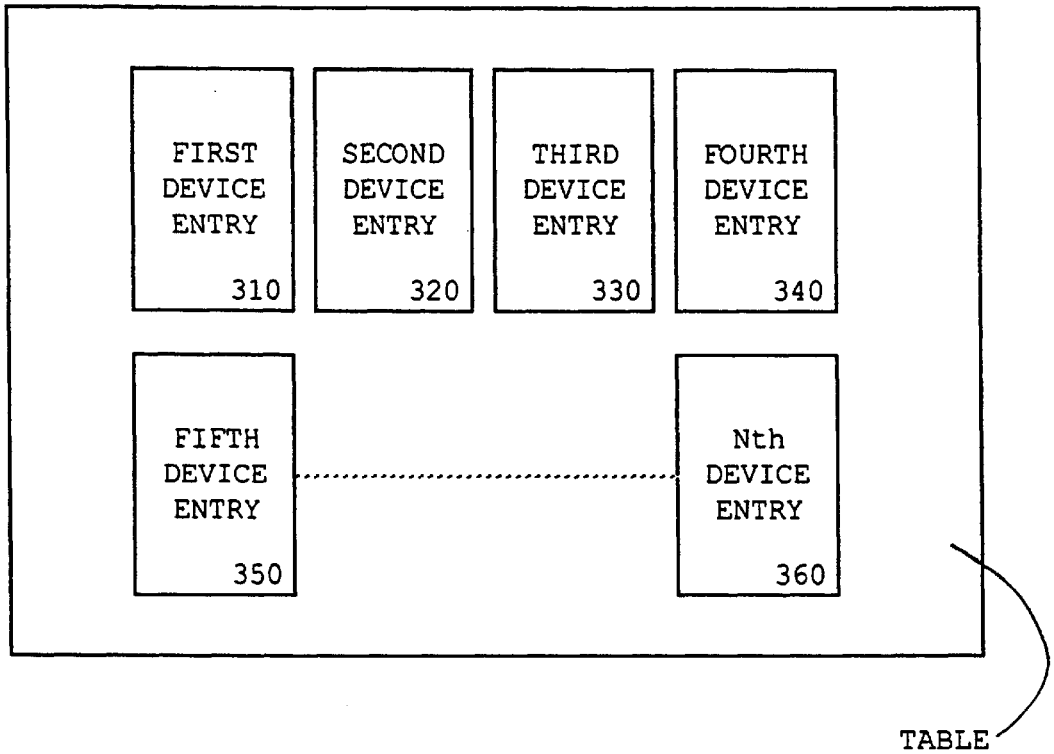
FIG. 3 illustrates a block diagram of a multiple client state machine table that is unique to a digital electronic source device in accordance with an embodiment of the present invention.
FIG. 4 illustrates a defined structure of an entry for a particular digital electronic sink device in the multiple client state machine table in accordance with one embodiment of the present invention.
Figure 5:
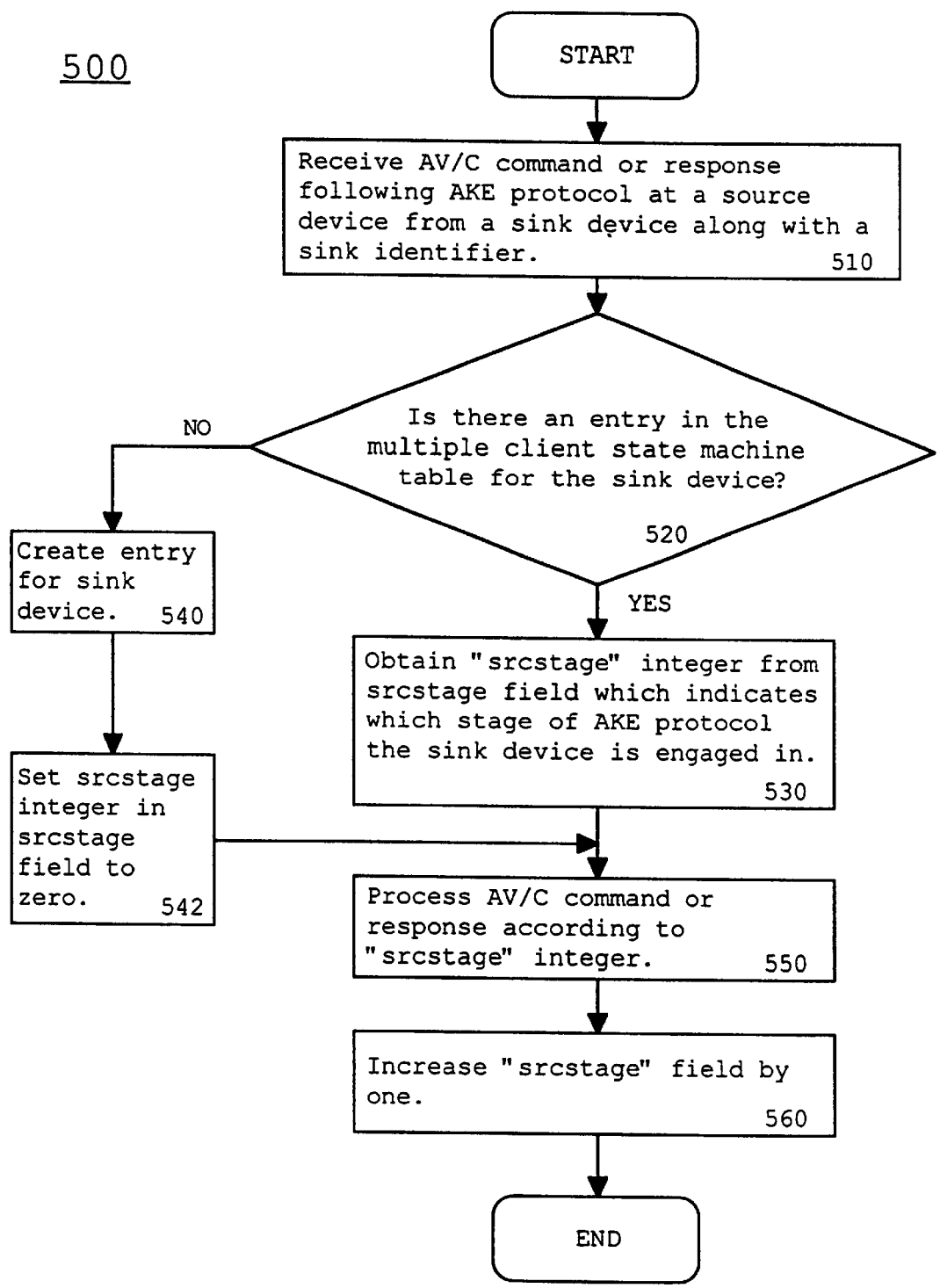
FIG. 5 is a flow diagram illustrating steps in a method for allowing a digital electronic source device to simultaneously conduct authentication and key exchange protocols with multiple sink devices in accordance with one embodiment of the present invention.

Digital electronic device 100 can be adapted to be incorporated into a communication system as shown in FIG. 2, can utilize the table in FIGS. 3 and 4, and can be adapted to implement the steps of the method as described in subsequent FIG. 5.

Performing Authentication and Key Exchange Protocols with Multiple Sink Devices

Embodiments of the present invention provide a method and system for a digital electronic source device to simultaneously perform authentication and key exchange protocols with multiple sink devices through the use of a multiple client state machine table. Embodiments of the present invention also maximize the bandwidth of a communication network by allowing a single source device to simultaneously send audio/video data packets to multiple sink devices. Further, embodiments of the present invention also allow a source device to recall authenticating a sink device such that the two devices would not have to again perform an authentication and key exchange protocol, even if the two devices have not been on the same communication network since performing the initial protocol.

Referring now to FIG. 2, in accordance with one embodiment of the present invention, a communications network 200 environment that follows the IEEE 1394 bus protocol is shown and includes a digital electronic source device 210 coupled to the following digital electronic sink devices: sink 220, sink 230, sink 240, sink 250, sink 260, and multiple client state machine 270. The exemplary network 200 illustrates that the various sink devices can be coupled to source 210 in a parallel configuration, e.g. direct links from a sink device to a source device, and in a series configuration. Although the present embodiment is discussed in a context using the IEEE 1394 bus protocol, the present invention is well suited to being used in communication systems with other types of communication bus protocols.

The source device 210 is capable of storing digital content and transmitting the digital content to another digital electronic sink device that is coupled to the network 200. In contrast, the various sink devices are capable of receiving, copying and playing digital content that is transmitted from the source device through the network 200. Furthermore, each of the source and sink devices could be capable of transmitting digital content and receiving digital content. As such, within network 200, sink 220 could be a source device that is capable of transmitting digital information to any of the devices on network 200 that are requesting the information. As an example, each of these devices could be a digital television (DTV), digital video cassette recorder (DVCR), digital versatile disc (DVD), digital camera, personal computer, digital audio receiver, and digital set-top box. While the present embodiment is exemplary, the present invention is well suited to using any number of components, and any type of components comparable to digital electronic device 100.

The IEEE 1394 bus protocol, in the present embodiment, provides an exemplary coupling configuration of devices in communication network 200 and is a peer-to-peer serial bus network with point-to-point signaling capabilities. As such, there isn't a specific host to manage and funnel the transmission of data throughout the network such as a PC in a Universal Serial Bus network. Additionally, an unlimited number of devices could theoretically be coupled together on network 200, all of which could communicate together. Further, each of the devices have nodes that act as repeaters to retransmit any packets of information to other nodes coupled to other devices on the network 200. With respect to the point-to-point signaling capability of the IEEE 1394 bus protocol, source 210 could transmit data to both sink 250 and sink 260 without any assistance from the other devices on the bus.

In another embodiment of the present invention, FIG. 3 illustrates a memory based multiple client state machine table 300 that is located on multiple client state machine 270. Table 300 is unique to a specific source device, such as source 210 in FIG. 2. Additionally, machine 270 and table 300 could also be located directly on the source device 210. The table 300 records the current stage a particular sink device is engaging within an authentication and key exchange protocol. Since table 300 keeps a record for each sink device undergoing an authentication and key exchange protocol with source 210, the source device 210 has the capability to simultaneously support authentication and key exchange protocols with multiple sink devices.

Referring to FIGS. 2 and 3, contained within said table 300 are entries associated with sink devices that are coupled to network 200. Those sink devices with an entry have initiated a 5C Digital Transmission Content Protection authentication and key exchange (hereinafter referred to as "5C DTCP AKE") communication protocol with the source device 210. For example, if all the sink devices in FIG. 2 have initiated a 5C DTCP AKE protocol with the source device, the first device entry 310 can be associated with sink 220, second device entry 320 can be associated with sink 230, third device entry 330 can be associated with sink 240, fourth device entry 340 can be associated with sink 250, and the fifth device entry 350 can be associated with sink 260.

In still another embodiment, in a communication network 200 that uses the IEEE 1394 serial bus protocol, an unlimited number of devices could theoretically be coupled to network 200. All of those devices could have initiated a 5C DTCP AKE protocol with the source device. As such, table 300 also could hold an unlimited number of entries as illustrated by the $n^{th}$ device entry 360, where n is a positive integer.

FIG. 4 illustrates an entry 400 on table 300 and defines the structure of the fields contained within the entries on the table 300. In one embodiment, the first two fields as a double word define a GUID device identification 410. In general, a GUID uniquely identifies any digital electronic device and can be permanently set at the factory on the device. The GUID can also be associated with any devices compliant with the 1394 bus protocol. Since the GUID is unique, the GUID can be used to distinguish entries in table 300. Thus, GUID 410 also identifies an entry on table 300 that is associated with a particular digital electronic sink device coupled to network 200. The field 415 defines the high order bits of GUID 410. The field 416 defines the low order bits of GUID 410. The "srcstage" field 420 defines as an integer the stage of the 5C DTCP AKE protocol the sink device associated with entry 400 is engaging.

In one embodiment, the 5C DTCP AKE protocol is a handshake protocol comprised of a linear order of stages conducted between two devices, a source device and a sink device. In each stage, an audio/video control (hereinafter referred to as "AV/C") command or response associated with the 5C DTCP AKE protocol is generated by each device. For example, in each stage, an AV/C command or response from a sink device is received at the source device. An appropriate AV/C command or response is transmitted by the source device and received at the sink device to complete the stage. As such, performance of each stage is easily tracked by assigning a similarly linear progression of integers to each corresponding stage. Although the present embodiment is discussed in a context using a 5C DTCP cryptography protocol system, the present invention is well suited to being used in systems with other types of communication and cryptography protocols.

Furthermore, since the 5C DTCP AKE protocol is easily tracked, one source device could simultaneously perform the 5C DTCP AKE protocol with multiple sink devices by tracking the progress of each of the 5C DTCP AKE protocols in a multiple client state machine table, such as table 300 in FIG. 3. Generally, for each AV/C command or response packet that is received at the source along with the GUID device identification of the sending sink device, the source need only to look up the entry associated with the sink device in table 300 and determine which stage of 5C DTCP AKE protocol the sink device is engaging. The source then processes the AV/C command or response according to the 5C DTCP AKE stage.

FIG. 5 is a flowchart of a process 500 illustrating steps for allowing a digital electronic source device to simultaneously conduct 5C DTCP AKE protocols with multiple sink devices in accordance with one embodiment of the present invention. Embodiments of the present invention are also applicable to any type of communication or cryptography protocol, as established for a given application. The source device and the multiple sink devices are coupled to a communication network, such as the one illustrated in FIG. 2. Process 500 begins with step 510. In step 510, an audio/video control (AV/C) command or response packet that is associated with a 5C DTCP AKE protocol sequence is received at the source device from a sink device. A sink device identification, such as GUID 410 in FIG. 4, is also sent with the AV/C command or response packet.

Then, in step 520 of FIG. 5, the source device searches for an entry that is associated with the present device identification (the sink device) in a multiple client state machine table that is unique to that source device. Each entry in the table is associated with a specific sink device that is currently engaged in a 5C DTCP AKE protocol with the source device. If there is an entry associated with the sink device, then process 500 proceeds to step 530. On the contrary, if there is not an entry, then process 500 proceeds to step 540.

Next, step 530 of FIG. 5 arises if there is an entry associated with the sink device in the state machine table. In order for the source device to process the AV/C command or response packet, in step 530, the source device determines from the "srcstage" field of the associated entry the proper stage within the 5C DTCP AKE protocol the sink device is currently engaging. Once the proper stage is determined, in step 550 the source device processes the AV/C command or response packet according to that determined stage. Included in the processing of the AV/C command or response packet, since the 5C DTCP is a handshake protocol, the source will respond with its own acknowledgment, or AV/C command or response that is sent back to the sink device. Furthermore, once the AV/C command or response is processed in the present embodiment, the integer in the "srcstage" field is increased by one in step 560 as the present stage of the 5C DTCP AKE protocol has been completed.

On the contrary, step 540 of FIG. 5 arises if there is not an entry associated with the sink device in the state machine table as determined in step 520. This is the case if the sink device desires to receive digital information from the source device and is initiating the 5C DTCP AKE protocol sequence. In step 540, an entry is created that is unique to the sink device. The device identification of the sink device is entered in the proper field. In step 542, the "srcstage" field is set to zero to indicate that the 5C DTCP AKE protocol is at the beginning stage. Process 500 then proceeds to step 550.

In step 550 of FIG. 5, the source device processes the AV/C command or response packet associated with the 5C DTCP AKE protocol according to the stage, in this case the initiating stage of the 5C DTCP AKE protocol sequence. Included in the processing of the command or response packet, since the 5C DTCP is a handshake protocol, the source will respond with its own acknowledgment, or AV/C command or response that is sent back to the sink device. Once the AV/C command or response is processed, the integer in the "srcstage" field is increased by one in step 560 as the present or initiating stage of the 5C DTCP AKE protocol has been completed.

In one embodiment of the invention, one source device can simultaneously conduct multiple 5C DTCP AKE protocols with multiple sink devices. Since the multiple client state machine table tracks the state of the 5C DTCP AKE protocol for each sink device, the source can properly process every AV/C command or response received. This is accomplished since the source can determine the current stage a particular sink device is engaging within the 5C DTCP AKE protocol. Thus, any AV/C command or response packet associated with a 5C DTCP AKE protocol from a first sink device can be properly processed by accessing the state information for the first sink device in a multiple client state machine table that is unique to that source device. This is possible even if the source device is also engaged in a 5C DTCP AKE protocol with a second sink device. Therefore, by keeping a record of the current stages of 5C DTCP AKE protocol for each sink device, the source device can distinguish each sink device separately and has the capability to simultaneously support 5C DTCP AKE protocols with multiple sink devices.

While the method illustrated in process 500 of one embodiment shows a specific sequence and quantity of steps, the present invention is suitable to alternative embodiments. For example, not all the steps provided for in the method are required for the present invention. Furthermore, additional steps can be added to the steps presented in the present embodiment. Likewise, the sequence of the steps can be modified depending upon the application.

The instructions for the steps, and the data input and output from the steps of process 500 may be implemented utilizing processor 101 and ROM memory 103 and RAM memory 102, as shown in FIG. 1. Memory storage of the present embodiment can include both permanent memory, such as read only memory ROM 103, and temporary memory such as random access memory RAM 102. Furthermore, other types of memory storage can be utilized to accomplish the aforementioned such as a hard drive, a CD ROM, or flash memory. Furthermore, processor 101 can either be a dedicated controller, an existing system processor, or it can be a dedicated digital signal processing processor. Alternatively, the instructions can be implemented using some form of a state machine.

In another embodiment of the present invention, the source device is able to maximize the bandwidth of a communication network utilizing the IEEE 1394 bus protocol. Using the multiple client state machine table, the source device is able to recognize multiple devices that have successfully completed the 5C DTCP AKE protocol with the source device. Therefore, instead of a single pair correspondence between one source and one sink, the one source device can simultaneously deliver multiple audio/video data packets to multiple sink devices over the network.

In still another embodiment of the present invention, once the 5C DTCP AKE protocol is successfully completed between a source device and a sink device, an encryption key is passed between the two devices. The encryption key allows the sink to decrypt the encrypted digital information that is transmitted from the source device to the sink device. Further, in another embodiment, the digital information that is transmitted can be comprised of audio and video information typically found in the entertainment medium.

In still another embodiment of the present invention, the source device is capable of performing stage location to determine if the AV/C command or response associated with the 5C DTCP AKE protocol that is sent by a sink device corresponds to the actual stage the sink device should be engaging. If the source determines that the AV/C command or response is improper and does not correspond to the actual stage of the 5C DTCP AKE protocol the sink device should be engaging, the source device will terminate the 5C DTCP AKE protocol session and reset the "srcstage" field to zero in the entry associated with that sink device. This is necessary to prevent unauthorized use of protected material by maintaining full compliance with the 5C DTCP specification.

Additionally, in still another embodiment of the present invention, a source device is capable of determining whether the 5C DTCP AKE protocol had been successfully performed with a particular sink device, even if the sink device has been physically disconnected from the source device or the network that contains the source device after successful completion of the 5C DTCP AKE protocol. Thus when it is recoupled to a communication network, as in a IEEE 1394 bus network, that contains the source device, the 5C DTCP AKE protocol need not be performed again. This saves time as in the case where a previously approved digital VCR is coupling to a previously approved source device on a network that has already begun to transmit time sensitive audio and video data packets, such as a pay per view movie.

In one embodiment, the assumption must be made that the GUID device identification that is unique to a particular digital electronic device is truly unique and can not be illegally duplicated. If this assumption cannot be made, then for security reasons, an entry associated with a particular sink device should be removed from the multiple client state machine table if that sink device is physically disconnected from the source device or the network that contains the source device. The sink device would have to perform the 5C DTCP AKE protocol again with the source device if it is recoupled to the source device or the communication network containing the source device.

A method and system for a digital electronic source device to simultaneously perform authentication and key exchange protocols with multiple sink devices, is thus described. While the present invention has been described in particular embodiments, it should be appreciated that the present invention should not be construed as limited by such embodiments, but rather construed according to the below claims.

What is claimed is:

1. A communication method comprising the steps of:
   a) conducting a first communication between an electronic source device and a first electronic sink device coupled to said source, said first communication conforming to an authentication and key exchange protocol;
   b) conducting a second communication between said source device and a second electronic sink device coupled to said source before the completion of said first communication, said second communication conducted in accordance with said protocol;
   c) creating a memory stored state table unique to said source device to record state information for said first and second communications; and
   d) accessing said state information for properly processing commands associated with said first and second communications, said accessing and processing performed by said source.

2. A method as described in claim 1 further comprising the step of:
   creating a multiple client state machine coupled to said source and comprising said state table, said table further comprising a first entry of first device identification and first state information associated with said first sink, and a second entry of second device identification and second state information associated with said second sink.

3. A method as described in claim 1 wherein said source and said sink devices are substantially compliant with a version of the 5C Digital Transmission Copy Protection specification.

4. A method as described in claim 1 wherein said source and said sink devices are substantially compliant with a version of the IEEE 1394 bus protocol.

5. A method as described in claim 1 wherein said protocol is substantially compliant with a version of the 5C Digital Transmission Copy Protection Authentication and Key Exchange protocol.

6. A method as described in claim 1 wherein said table is located on said source.

7. A method as described in claim 1 further comprising the steps of:
   determining whether said commands associated with said first and second communications correspond to the proper stages within the execution of said first and second communications; and
   terminating said communications if said commands do not correspond to the proper stages.

8. A method as described in claim 1 further comprising the step of:
   determining whether said first and second communications were successfully performed previously so that said communications need not be performed again even if said sink devices have been decoupled from said source.

9. A method as described in claim 1 further comprising the step of:
   conducting a third communication between said source device and a third electronic sink device coupled to said source before the completion of said first and second communications, said third communication conducted in accordance with said protocol.

10. A method as described in claim 1 further comprising the step of updating said state information after processing said commands.

11. A communication method comprising the steps of:
   a) conducting a first communication between an electronic source device and a first electronic sink device coupled to said source, said first communication conforming to an authentication and key exchange protocol;
   b) conducting a second communication between said source device and a second electronic sink device coupled to said source before the completion of said first communication, said second communication conducted in accordance with said protocol;
   c) creating a multiple client state machine coupled to said source comprising a memory stored state table unique to said source device to record state information for said communications, said table further comprising a first entry associated with said first sink, and a second entry associated with said second sink;
   d) storing in said first entry a first device identification and first state information, said storing performed by said source;
   e) storing in said second entry a second device identification and second state information, said storing performed by said source; and
   f) accessing said first and second state information for properly processing commands associated with said first and second communications, said accessing and processing performed by said source.

12. A method as described in claim 11 wherein the step of accessing said first state information comprises the steps of:
   receiving at said source device a first command from said first sink along with a corresponding said first device identification, said first command associated with said first communication;
   using said first device identification to access said first entry and said first state information; and
   processing said first command according to said first state information.

13. A method as described in claim 11 wherein the step of accessing said second state information comprises the steps of:
   receiving at said source a second command from said second sink along with a corresponding said second device identification, said second command associated with said second communication;
   using said second device identification to access said second entry and said second state information; and
   processing said second command according to said second state information.

14. A method as described in claim 11 further comprising the step of updating said first and second state information after processing said commands.

15. A method as described in claim 11 wherein said source and said sink devices are substantially compliant with a version of the 5C Digital Transmission Copy Protection specification.

16. A method as described in claim 11 wherein said source and said sink devices are substantially compliant with a version of the IEEE 1394 bus protocol.

17. A method as described in claim 11 wherein said protocol is substantially compliant with a version of the 5C Digital Transmission Copy Protection Authentication and Key Exchange protocol.

18. A digital electronic source device comprising:
   a processor;
   a multiple client state table coupled to said processor; and
   a computer readable memory coupled to said processor and containing program instructions that, when executed, implement a method of communication, said method comprising the steps of:
   a) conducting a first communication between said source and a first electronic sink device coupled to said source, said first communication conforming to an authentication and key exchange protocol;
   b) conducting a second communication between said source device and a second electronic sink device coupled to said source before the completion of said first communication, said second communication conducted in accordance with said protocol;
   c) creating a memory stored state table unique to said source device to record state information for said first and second communications; and
   d) accessing said state information for properly processing commands associated with said first and second communications, said accessing and processing performed by said source.

19. A device as described in claim 18, wherein said method further comprises the step of:
   creating a multiple client state machine coupled to said source and comprising said state table, said table further comprising a first entry of first device identification and first state information associated with said first sink, and a second entry of second device identification and second state information associated with said second sink.

20. A device as described in claim 18, wherein said source and said sink devices are substantially compliant with a version of the 5C Digital Transmission Copy Protection specification.

21. A device as described in claim 18, wherein said source and said sink devices are substantially compliant with a version of the IEEE 1394 bus protocol.

22. A device as described in claim 18, wherein said protocol is substantially compliant with a version of the 5C Digital Transmission Copy Protection Authentication and Key Exchange protocol.

23. A device as described in claim 18 wherein said table is located on said source.

24. A device as described in claim 18, wherein said method further comprises the steps of:
   determining whether said commands associated with said first and second communications correspond to the proper stages within the execution of said first and second communications; and
   terminating said communications if said commands do not correspond to the proper stages.

25. A device as described in claim 18, wherein said method further comprises the step of:

determining whether said first and second communications were successfully performed previously so that said communications need not be performed again even if said sink devices have been decoupled from said source.

26. A device as described in claim 18, wherein said method further comprises the step of:

conducting a third communication between said source device and a third electronic sink device coupled to said source before the completion of said first and second communications, said third communication conducted in accordance with said protocol.

27. A device as described in claim 18, wherein said method further comprises the step of updating said state information after processing said commands.

* * * * *